(12) United States Patent
Lam

(10) Patent No.: US 9,336,314 B2
(45) Date of Patent: May 10, 2016

(54) DYNAMIC FACET ORDERING FOR FACETED SEARCH

(75) Inventor: Lawrence Lam, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 303 days.

(21) Appl. No.: 12/980,871

(22) Filed: Dec. 29, 2010

(65) Prior Publication Data

US 2012/0173521 A1 Jul. 5, 2012

(51) Int. Cl.
 *G06F 17/30* (2006.01)

(52) U.S. Cl.
 CPC .... *G06F 17/30867* (2013.01); *G06F 17/30648* (2013.01)

(58) Field of Classification Search
 CPC ................................................. G06F 17/30648
 USPC .................. 707/708, 728, 731, 734
 See application file for complete search history.

(56) References Cited

U.S. PATENT DOCUMENTS

| | | | |
|---|---|---|---|
| 7,392,250 B1 | 6/2008 | Dash et al. | |
| 7,730,059 B2 | 6/2010 | Behnen et al. | |
| 2006/0004711 A1* | 1/2006 | Naam | 707/3 |
| 2006/0288039 A1* | 12/2006 | Acevedo-Aviles et al. | 707/104.1 |
| 2006/0294071 A1* | 12/2006 | Weare et al. | 707/3 |
| 2007/0233654 A1 | 10/2007 | Karlson et al. | |
| 2007/0294615 A1* | 12/2007 | Sathe | 715/517 |
| 2008/0027932 A1* | 1/2008 | Brunner et al. | 707/6 |
| 2008/0306928 A1* | 12/2008 | Brunner et al. | 707/4 |
| 2009/0100036 A1 | 4/2009 | Bedrax-Weiss et al. | |
| 2009/0171813 A1* | 7/2009 | Byrne et al. | 705/27 |
| 2009/0222412 A1 | 9/2009 | Lee et al. | |
| 2009/0292674 A1* | 11/2009 | Dasdan et al. | 707/3 |
| 2012/0131033 A1* | 5/2012 | Bierner | 707/767 |

FOREIGN PATENT DOCUMENTS

| | | |
|---|---|---|
| CN | 1716257 A | 1/2006 |
| CN | 1750002 A | 3/2006 |
| CN | 101903878 A | 12/2010 |

OTHER PUBLICATIONS

Personalized Interactive Faceted Search—Published Date: Apr. 2008 http://www2008.org/papers/pdf/p477-korenA.pdf.

(Continued)

*Primary Examiner* — Grace Park
(74) *Attorney, Agent, or Firm* — Dave Ream; Tom Wong; Micky Minhas

(57) ABSTRACT

Methods for dynamically ordering facets for search result presentation are provided. Facets specific to a query are determined and facet orderings are dynamically generated. A number of search result arrangements are generated based upon the facet orderings and, as users input the query, various search results arrangements are presented and user engagement with respect thereto is monitored. To determine which of the arrangements to present to a given user, a number of factors are taken into account, e.g., previous user engagement for each arrangement across a segment or population of users, and whether the user has previously been shown any of the arrangements and, if so, the nature of the user's engagement therewith. Each time an arrangement is presented to a user and the user's behavior with respect thereto is recorded, additional data becomes available for deciding what arrangement to show the next time a user inputs the query.

20 Claims, 5 Drawing Sheets

(56) References Cited

OTHER PUBLICATIONS

Dynamic Category Sets: An Approach for Faceted Search—Published Date: 2006 http://citeseerx.ist.psu.edu/viewdoc/download?doi=10.1.1.83.4202&rep=rep1&type=pdf.

Adaptive Faceted Browser for Navigation in Open Information Spaces—Published Date: 2007 http://www2007.org/posters/poster987.pdf.

Challenges for Supporting Faceted Search in Large, Heterogeneous Corpora like the Web—Published Date: Oct. 2008 http://people.csail.mit.edu/teevan/work/publications/workshops/hcir08.pdf.

Chinese Search Report dated Jan. 11, 2014 in Chinese Application No. 201110449854.4, 2 pages.

Chinese Office Action dated Jan. 22, 2014 in Chinese Application No. 201110449854.4, 10 pages.

Chinese Search Report dated Jul. 1, 2014 in Chinese Application No. 201110449854.4, 2 pages.

Chinese Office Action dated Jul. 14, 2014 in Chinese Application No. 201110449854.4, 17 pages.

* cited by examiner

DYNAMIC FACET ORDERING FOR FACETED SEARCH

BACKGROUND

Faceted search, that is, search wherein search results are filtered based upon aspects or facets that are particular to the query being searched, has gained popularity as a way of presenting search results so as to increase user engagement therewith. Objects and/or subjects of a query often have a large number of facets on which they can be filtered. Thus, determining on which facets to filter search results such that user engagement is maximized is important to insuring that the full benefits of faceted search are realized. Generally, this is a highly manual process wherein a particular query is received, various facet-filters decided upon by knowledge workers or domain experts are applied to a set of results for the particular query, the results are presented to various users in accordance therewith, and user engagement with the arrangement of results is monitored. Based upon manual analysis of the user engagement data, a single, most successful arrangement is decided upon and shown to all future users upon input of the particular query.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable media for, among other things, dynamically ordering facets for search result presentation. Facets specific to a particular query are determined and a plurality of facet orderings are dynamically generated. A number of various search result arrangements are generated based upon the various facet orderings. As a plurality of users input the particular query, a similar query, or a query belonging to a common query vector, various ones of the search results arrangements are presented and user engagement with respect thereto is monitored. To determine which of the arrangements to present to a given user, a number of factors are taken into account including, but not limited to, previous user engagement for each arrangement across a population of users and whether the given user has previously been shown any of the arrangements and, if so, the nature of the given user's engagement therewith. Each time an arrangement is presented to a user and the user's behavior with respect thereto is monitored and recorded, additional data is available for use in deciding what arrangement to show the next time this user, or any user, inputs the particular query, a similar query, or a query belonging to a common query vector. That is, the system continues to improve and can quickly and automatically (that is, without user interactions) respond to trends that may cause variations in the success of particular arrangements. Additionally, a single arrangement to be shown to all users inputting the particular query does not need to be decided upon. Rather, arrangements that yield high user engagement for a particular user or segment of users can be presented to those users while alternate arrangements that yield higher user engagement for other users or segments of users can be presented to those segments.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
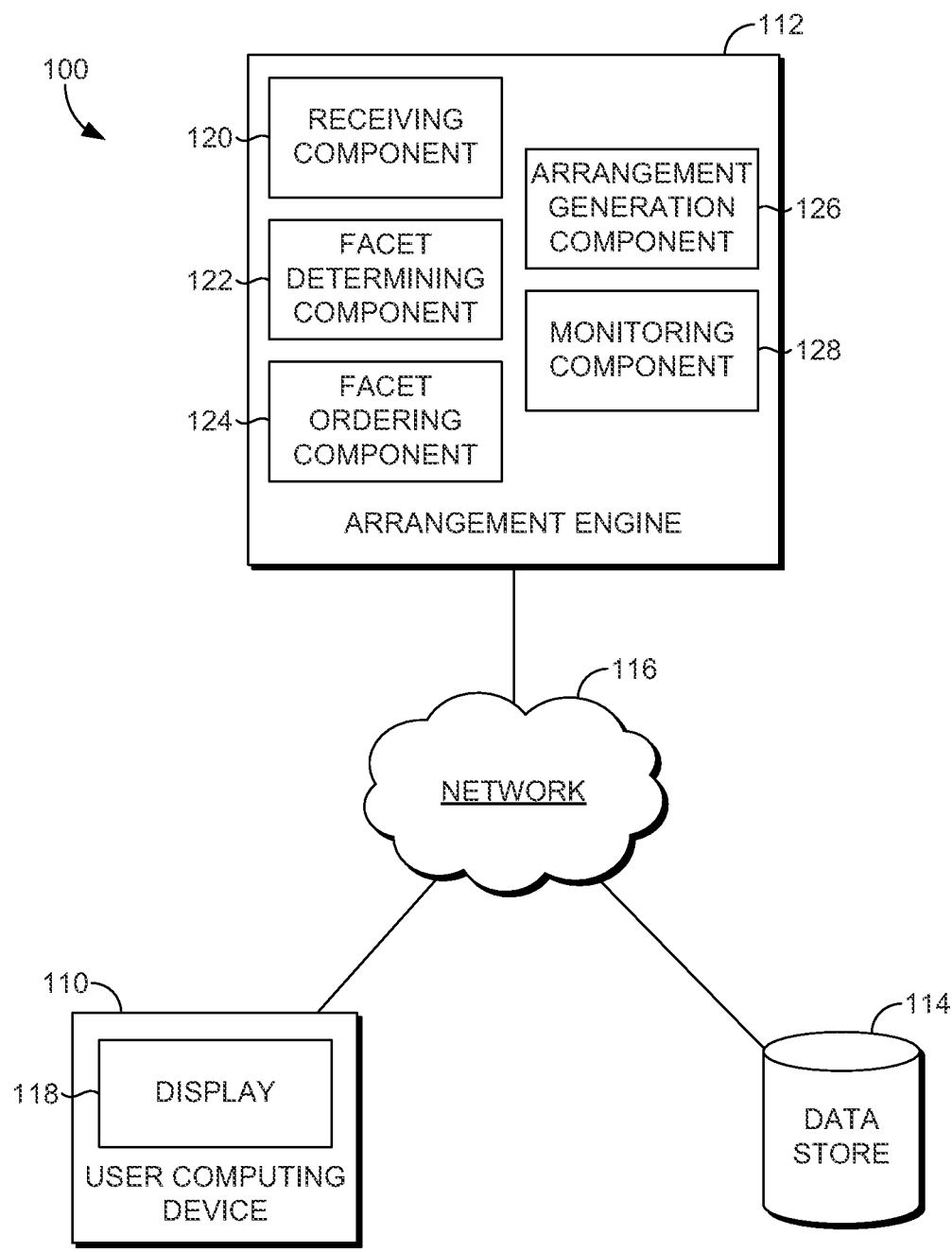
FIG. 1 is a block diagram of an exemplary computing system environment suitable for use in implementing embodiments of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable media for, among other things, dynamically ordering facets for search result presentation. "Facets," as the term is utilized herein, are definable aspects that make up an object or a subject; in the case of the present invention, facets are aspects that are specific to a received query. For instance, if a query were received by a search engine containing the terms "digital camera," facets that are specific to the query may include "lens," or "digital screen size," or "zoom," or the like. Similarly, if a user is searching for images, facets that are specific to the query may include "portrait," or "landscape," or "color," or the like.

In accordance with embodiments of the present invention, facets are utilized to filter search results for presentation to the user. Thus, instead of having a plurality of search results presented in response to a query that are randomly ordered (or ordered according to an algorithm independent of facets), the search results are filtered based upon one or more facets and then presented to the user. In this way, users are presented with a plurality of search results that pertain to particular aspects of the object or subject of the input query which, accordingly, may result in higher user engagement with the results.

In accordance with embodiments hereof, upon receipt of a particular query, facets related to the particular query are determined. Subsequently, a plurality of facet orderings is dynamically generated, each of the plurality of facet orderings including at least a portion of the facets related to the particular query. Given the possible number of potential facets that may pertain to a given query, and the number of ways in which the potential aspects may be ordered, the quantity of potential facet orderings may range from only a few to hundreds or thousands, depending upon the query. Search results satisfying the query are filtered based upon at least a portion of the determined facets and arranged based upon one or more of the potential facet orderings. As such, a number of search result arrangements may be generated based upon each of the various facet orderings.

As a plurality of users input the particular query (or a similar query, or a query belonging to a common query vector, as more fully described below), various ones of the search results arrangements are presented and user engagement with respect thereto is monitored. User engagement may be monitored based upon a number of different measures of user behavior including, but not limited to, dwell time, total session time, search result selection, quantity of page flips, and the like. Further, user engagement may be measured comparatively (e.g., do users tend to select more search results from one arrangement versus another arrangement) or based upon a threshold (e.g., has this user flipped through at least three pages since presentation). Additionally, measures of user behavior may be given a value with respect to a particular arrangement. By way of example, and not limitation, such values may be quantitative (e.g., an actual count of page flips), binary (e.g., if a threshold has been met a value of one may be given and if the threshold has not been met, a value of zero may be given), or any combination thereof.

To determine which of the arrangements to present to a given user, a number of factors may be taken into account including, but not limited to, previous user engagement for each arrangement across a population of users and whether the given user has previously been shown any of the arrangements and, if so, the nature of the given user's engagement therewith. Each time an arrangement is presented to a user and the user's behavior with respect thereto is monitored, information pertaining to one or more of the input query, the facet ordering, the search result arrangement, the user behavior, any value recorded for the user behavior, user-specific information (e.g., identity information), and the like may be recorded in a data store. Thus, each time presentation data is recorded, additional data is available for use in deciding what arrangement to show the next time this user, or any user, inputs the particular query, a query that is substantially similar thereto, or a query belonging to a common query vector. That is, the system continues to improve and can quickly and automatically (that is, without user interaction) respond to trends that may cause variations in the success of particular arrangements and can seamlessly introduce new/additional information. Additionally, a single arrangement to be shown to all users inputting the particular query, a similar query, or a query belonging to a common query vector, does not need to be decided upon. Rather, arrangements that yield high user engagement for a particular user or segment of users can be presented to those users while alternate arrangements that yield higher user engagement for other users or segments of users can be presented to those users/segments.

Accordingly, in one embodiment, the present invention is directed to one or more computer-storage media having computer-executable instructions embodied thereon, that when executed, cause a computing device to perform a method for dynamically ordering facets for search result presentation. The method includes receiving a first query, determining a plurality of facets that pertain to the first query, and dynamically generating a first facet ordering, the first facet ordering including at least a first portion of the plurality of facets that pertain to the first query. The method further includes presenting search results arranged in accordance with the first facet ordering in a first arrangement, monitoring at least one measure of user behavior with regard to the first arrangement, and storing the first arrangement and a value of the at least one measure of user behavior with respect thereto in association with one another. In embodiments, the method may further include receiving a second query, the second query being the same or similar to the first query, or belonging to a common query vector, and dynamically generating a second facet ordering, the second facet ordering including at least a second portion of the plurality of facets that pertain to the first query. In such embodiments, the method may further include monitoring the at least one measure of user behavior with regard to the second arrangement, and storing the second arrangement and a value of the at least one measure of user behavior with respect thereto in association with one another.

In yet another aspect, the present invention is directed to a system for dynamically ordering facets for search result presentation. The system comprises a computing device associated with one or more processors and one or more computer storage media; a data store coupled with the computing device; a facet ordering component that dynamically generates facet orderings including at least a portion of a plurality of facets, the portion pertaining to a received query; and an arrangement generation component that presents search results in arrangements based upon the facet orderings. In embodiments, the system further comprises a monitoring component that monitors at least one measure of user behavior with regard to a first arrangement and a second arrangement; compares a value of the at least one measure of user behavior with respect to the first arrangement with a value of the at least one measure of user behavior with respect to the second arrangement; determines which of the first and second arrangements yields higher user engagement based upon the comparison of the value of the at least one measure of user behavior with respect to the first and second arrangements; and categorizes the one of the first and second arrangements yielding the higher user engagement based upon the comparison as a successful arrangement.

In another aspect, the present invention is directed to one or more computer-storage media having computer-executable instructions embodied thereon that, when executed, perform a method for dynamically ordering facets for search result presentation. The method comprises receiving a first query from a user; receiving a user identifier associated with the user; and dynamically generating a first facet ordering, the first facet ordering including at least a first portion of a plurality of facets that pertain to the first query. The method further includes presenting search results arranged in accordance with the first facet ordering in a first arrangement; monitoring at least one measure of user behavior with regard to the first arrangement; storing the first arrangement and a value of the at least one measure of user behavior with respect thereto in association with one another. Still further, the method includes receiving a second query from the user, the second query being the same or similar to the first query, or belonging to a common query vector; and determining whether the first arrangement is a successful arrangement based upon the at least one measure of user behavior with regard thereto. Upon determining that the first arrangement is a successful arrangement, the method further comprises presenting the first arrangement to the user in response to receiving the second query. Upon determining that the first arrangement is a failed arrangement, the method further comprises dynamically generating a second facet ordering, the second facet ordering including at least a second portion of the plurality of facets that pertain to the first query; and presenting search results arranged in accordance with the second facet ordering in a second arrangement.

Turning now to FIG. 1, a block diagram is illustrated that shows an exemplary computing system environment 100 suitable for use in implementing embodiments of the present invention. It will be understood and appreciated by those of ordinary skill in the art that the computing system environment 100 shown in FIG. 1 is merely an example of one suitable computing system environment and is not intended to suggest any limitation as to the scope of use or functionality of embodiments of the present invention. Neither should the computing system environment 100 be interpreted as having any dependency or requirement related to any single module/component or combination of modules/components illustrated therein.

The computing system environment 100 includes a computing device 110, an arrangement engine 112, and a data store 114, all in communication with one another via a network 116. The network 116 may include, without limitation, one or more local area networks (LANs) and or wide area networks (WANs). Such networking environments are commonplace in offices, enterprise-wide computer networks, intranets and the Internet. Accordingly, the network 116 is not further described herein.

In some embodiments, one or more of the illustrated components/modules may be implemented as stand-alone applications. In other embodiments, one or more of the illustrated components/modules may be integrated directly into the operating system of the arrangement engine 112 and/or the end-user computing device 110. It will be understood by those of ordinary skill in the art that the components/modules illustrated in FIG. 1 are exemplary in nature and in number and should not be construed as limiting. Any number of components/modules may be employed to achieve the desired functionality within the scope of embodiments hereof. Further, components/modules may be located on any number of servers or client computing devices. By way of example only, the arrangement engine 112 might reside on a server, cluster of servers, or a computing device remote from one or more of the remaining components.

It should be understood that this and other arrangements described herein are set forth only as examples. Other arrangements and elements e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The data store 114 is configured to store information associated with dynamically ordered and generated faceted-search result presentations. In various embodiments, such information may include, without limitation, received search queries, query-based facets, facet orderings, search result arrangements, measures of user engagement, historical behavior specific to particular users, and the like. In embodiments, the data store 114 is configured to be searchable for one or more of the items stored in association therewith. It will be understood and appreciated by those of ordinary skill in the art that the information stored in association with the data store 114 may be configurable and may include any information relevant to dynamically ordered and generated faceted-search result presentations and/or the like. The content and volume of such information are not intended to limit the scope of embodiments of the present invention in any way. Further, though illustrated as a single, independent component, the data store 114 may, in fact, be a plurality of storage devices, for instance a database cluster, portions of which may reside on the arrangement engine 112, the computing device 110, another external computing device (not shown), and/or any combination thereof.

Each of the computing device 110 and the arrangement engine 112 shown in FIG. 1 may be any type of computing device, such as, for example, the computing device 500 described below with reference to FIG. 5. By way of example only and not limitation, each of the computing device 110 and the arrangement engine 112 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof.

Components of the computing device 110 and the arrangement engine 112 (not shown for clarity) may include, without limitation, a processing unit, internal system memory, and a suitable system bus for coupling various system components, including one or more databases for storing information (e.g., files and metadata associated therewith). Each of the computing device 110 and the arrangement engine 112 typically includes, or has access to, a variety of computer-readable media. By way of example, and not limitation, computer-readable media may include computer-storage media and communication media. In general, communication media enables each server to exchange data via a network, e.g., network 116. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that computing system environment 100 is merely exemplary. While the arrangement engine 112 and the data store 114 are illustrated as single units, one skilled in the art will appreciate that the arrangement engine 112 and the data store 114 are scalable. For example, the arrangement engine 112 may in actuality include a plurality of computing devices in communication with one another. Moreover, the data store 114, or portions thereof, may be included within, for instance, the arrangement engine 114 and/or the computing device 110 as a computer-storage medium. The single unit depictions are meant for clarity, not to limit the scope of embodiments in any form.

As shown, the end-user computing device 110 includes a display screen 118. The display screen 118 is configured to display information to the user of the computing device 110, for instance, information relevant to communications initiated by and/or received by the computing device 110, search queries, faceted arrangements of search results, and the like. Embodiments are not intended to be limited to visual display but rather may also include audio presentation, combined audio/visual presentation, and the like.

As shown in FIG. 1, the arrangement engine 112 includes a receiving component 120, a facet determining component 122, a facet ordering component 124, an arrangement generation component 126, and a monitoring component 128. In some embodiments, one or more of the components 120, 122, 124, 126, and 128 may be implemented as stand-alone applications. In other embodiments, one or more of the components 120, 122, 124, 126, and 128 may be integrated directly into the operating system of the computing device 110. It will be understood by those of ordinary skill in the art that the components 120, 122, 124, 126, and 128 illustrated in FIG. 1 are exemplary in nature and in number and should not be construed as limiting. Any number of components may be employed to achieve the desired functionality within the scope of embodiments hereof.

The receiving component 120 is configured to receive queries input by users and to transmit received queries to the facet determining component 122 to determine facets particular to the received query, as more fully described below. The receiving component 120 is further configured to receive user identifiers associated with users from whom input queries are received. Still further, the receiving component 120 is configured to query the data store 114 (e.g., via network 116) for information specific to the user and/or to the received query. That is, the receiving component 120 is configured to query the data store 114 for information as to whether the user associated with the received user identifier has previously input the particular query. User-identifiers may be positively identify a particular user, may be anonymous, and/or may identify the user as belonging to a particular segment of users, for instance, males in their early forties and living in Seattle. If the user associated with the received user identifier has previously input the particular query (or a similar query, or a query belonging to the same query vector or grouping), it is next determined whether a facet-based arrangement of search results has been previously shown to the user. It will be understood and appreciated by those of ordinary skill in the art that in determining whether a particular query has been previously input by the user, queries that are similar or substantially similar to the input query may be considered as well, as may queries that belong to the same query vector or grouping. Queries may be considered similar or substantially similar based upon a number of factors including, but not limited to, a percentage of search results that are identical to one another upon input of each of the two queries. For instance, query A and query B may be determined to be substantially similar to one another if search results identified as satisfying the two queries overlaps by at least 95%. Queries may be considered to belong to the same query vector or grouping if, for instance, the two queries are in the same general subject matter area and are received within a specified time frame of one another. For instance, a particular arrangement of search results may be selected for presentation to the user for the query "digital cameras" based upon the fact that the user's previous query in the same session (for instance, less than one minute prior) was "professional film." Additionally, if there is a plurality of users searching in the same or a similar pattern, the facet-based arrangement shown may be geared toward professional use rather than home use, thus the choice of megapixels to show, for instance, may differ.

The receiving component 120 is additionally configured to query the data store 114 for information regarding whether, based upon at least one target criterion, presentation of a facet-based arrangement of search results previously shown to the user is permissible at the present time. For instance, a threshold criterion based upon a time lag between the time the previously-shown arrangement was presented to the user and the present time may indicate that too much time has passed since the user was last presented with the previously-shown arrangement and, accordingly, the previously-shown facet-based arrangement is not to be presented to the user. By way of another example, a threshold criterion based upon user engagement with the previously-shown arrangement may indicate that the user interacted sufficiently with the previously-shown arrangement to warrant presenting the user with the same arrangement a subsequent time. In embodiments, threshold criteria may be automated and/or based upon business considerations that are manually defined. Any and all such variations, and any combination thereof, are contemplated to be within the scope of embodiments of the present invention.

The receiving component 120 is further configured to query the data store 114 for information regarding whether a previously-shown facet-based arrangement was considered a successful or failed arrangement with respect to the particular user, a particular segment of users, and/or to a general population of users to whom the particular arrangement was shown. Based upon this information, the arrangement generation engine 112 may or may not present the particular arrangement to the user a subsequent time.

The facet determining component 122 is configured to determine facets pertaining to a received query. In this regard, the facet determining component 122 is configured to receive an input query from the receiving component 120 of the arrangement engine 112. Once facets are determined, the facet ordering component 124 is configured to receive the determined facets from the facet determining component 122 and to dynamically (i.e., without user interaction) generate facet orderings, each facet ordering including at least a portion of the plurality of facets that pertain to the received query. Given the possible number of potential facets that may pertain to a received query, and the number of ways in which the potential aspects may be ordered, the quantity of potential facet orderings may range from only a few to hundreds or thousands, depending upon the received query.

The arrangement generation component 126 is configured to generate arrangements of search results ordered in accordance with facet orderings received from the facet ordering component 124. That is, search results determined as satisfying the query are filtered based upon at least a portion of the facets determined by the facet ordering component 124 and organized into presentable arrangements based upon one or more of the potential facet orderings. In this regard, the arrangement generation component 126 is configured to receive facet orderings from the facet ordering component 124 and to transmit generated arrangements to the user computing device 110 (e.g., via network 116) for presentation in association with the display screen 118.

In embodiments wherein a previously-shown arrangement is determined to be available and permitted to be shown at a present time, as described herein above, the arrangement generation component 126 is configured to receive information pertaining to the previously-shown arrangement from the data store 114 (e.g., via network 114) and to transmit the previously-shown arrangement to the user computing device 110 for presentation in association with the display screen 118.

The monitoring component 128 is configured to monitor at least one measure of user behavior with regard to a variety of facet-based search result arrangements. That is, the monitoring component 128 is configured to receive input of various measures of user behavior (e.g., from the user computing device 110 via network 116). By way of example and not limitation, such measures of user behavior may include dwell time, total session time, search result selection, quantity of page flips, and the like. As previously set forth, user engagement may be measured comparatively or based upon a threshold. Additionally, measures of user behavior may be given a value with respect to a particular arrangement. By way of example, and not limitation, such values may be quantitative, binary, or any combination thereof.

The monitoring component 128 is further configured to compare a value of the at least one measure of user behavior with respect to various arrangements with a value of the at least one measure of user behavior with respect to other arrangements. Still further, the monitoring component 128 is configured to determine which of the two or more arrangements yields higher user engagement based upon the comparison of the value of the at least one measure of user behavior with respect to each and to categorize the one of the compared arrangements yielding the higher user engagement based upon the comparison as a successful arrangement and/or categorizing the one of the compared arrangements yielding the lowest user engagement based upon the comparison as a failed arrangement.

Figure 2:
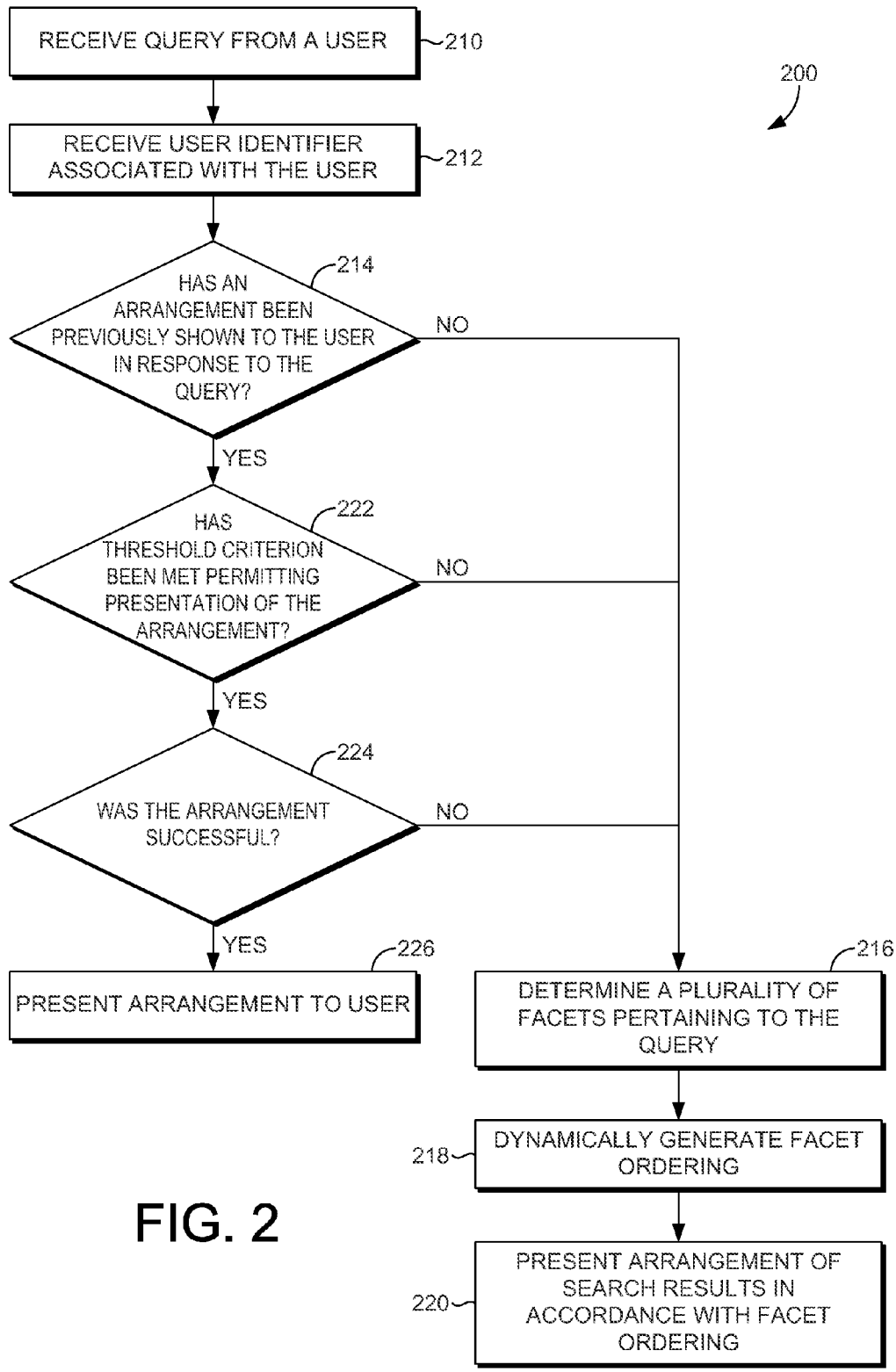
FIG. 2 is a flow diagram showing a method for dynamically ordering facets for search result presentation, in accordance with embodiments of the present invention.

With reference to FIG. 2, a flow diagram is illustrated showing a method 200 for dynamically ordering facets for search result presentation, in accordance with an embodiment of the present invention. As shown at block 210, a query is received from a user. Also received is a user identifier associated with the user, as shown at block 212. It is determined whether an arrangement has been previously been shown to the user in response to the same or a substantially similar query, or a query belonging to a common query vector. This is shown at block 214. If it is determined that an arrangement has not previously been shown to the user in response to the same or a substantially similar query (or a query belonging to a common query vector), a plurality of facets pertaining to the query is determined, as shown at block 216. A facet ordering including at least a portion of the plurality of facets that pertain to the first query is dynamically generated, as shown at block 218. Search results arranged in accordance with the facet ordering are shown to the user, as shown at block 220.

Returning to block 214, if it is determined that an arrangement has previously been shown to the user in response to the same or a substantially similar query (or a query belonging to a common query vector), it is determined whether at least one threshold criterion has been met permitting presentation of the previously-shown arrangement. This is shown at block 222. If it is determined based on at least one threshold criterion that presentation of the previously-shown arrangement is not permitted, the method proceeds to block 216. If, however, it is determined that presentation of the previously-shown arrangement is permitted, it is determined whether the previously-shown arrangement has been categorized as a successful arrangement—with respect to the general user population, with respect to a particular user segment, and/or with respect to the user specifically. This is indicated at block 224. If it is determined that the previously-shown arrangement was a failed or unsuccessful arrangement, the method proceeds to block 216. If, however, it is determined that the previously-shown arrangement was successful, the previously-shown arrangement is presented to the user, as shown at block 226.

Figure 3:
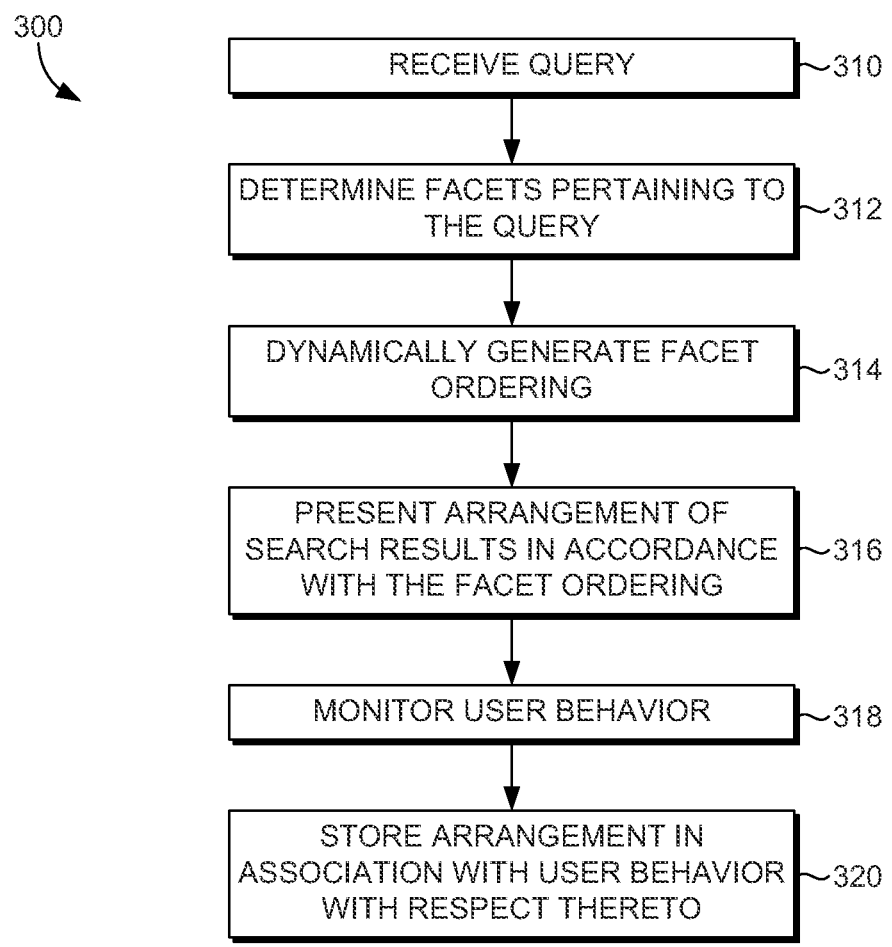
FIG. 3 is a flow diagram showing another method for dynamically ordering facets for search result presentation, in accordance with embodiments of the present invention.

Turning now to FIG. 3, a flow diagram is illustrated showing a method 300 for dynamically ordering facets for search result presentation, in accordance with an embodiment of the present invention. As shown at block 310, a query is received. Next, as indicated at block 312, a plurality of facets that pertain to the query is determined. A facet ordering is then dynamically generated, as indicated at block 314, the facet ordering including at least a portion of the plurality of facets determined to pertain to the query. As indicated at block 316, search results arranged in accordance with the facet ordering are presented. At least one measure of user behavior with respect to the search result arrangement is monitored, as indicated at block 318, and the search result arrangement is stored in association with a value of the at least one measure of user behavior with respect thereto, as indicated at block 320. In another embodiment (not shown), failed search result arrangements may be discarded rather than stored. Any and all such variations, and any combination thereof, are contemplated to be within the scope of embodiments of the present invention.

Figure 4:
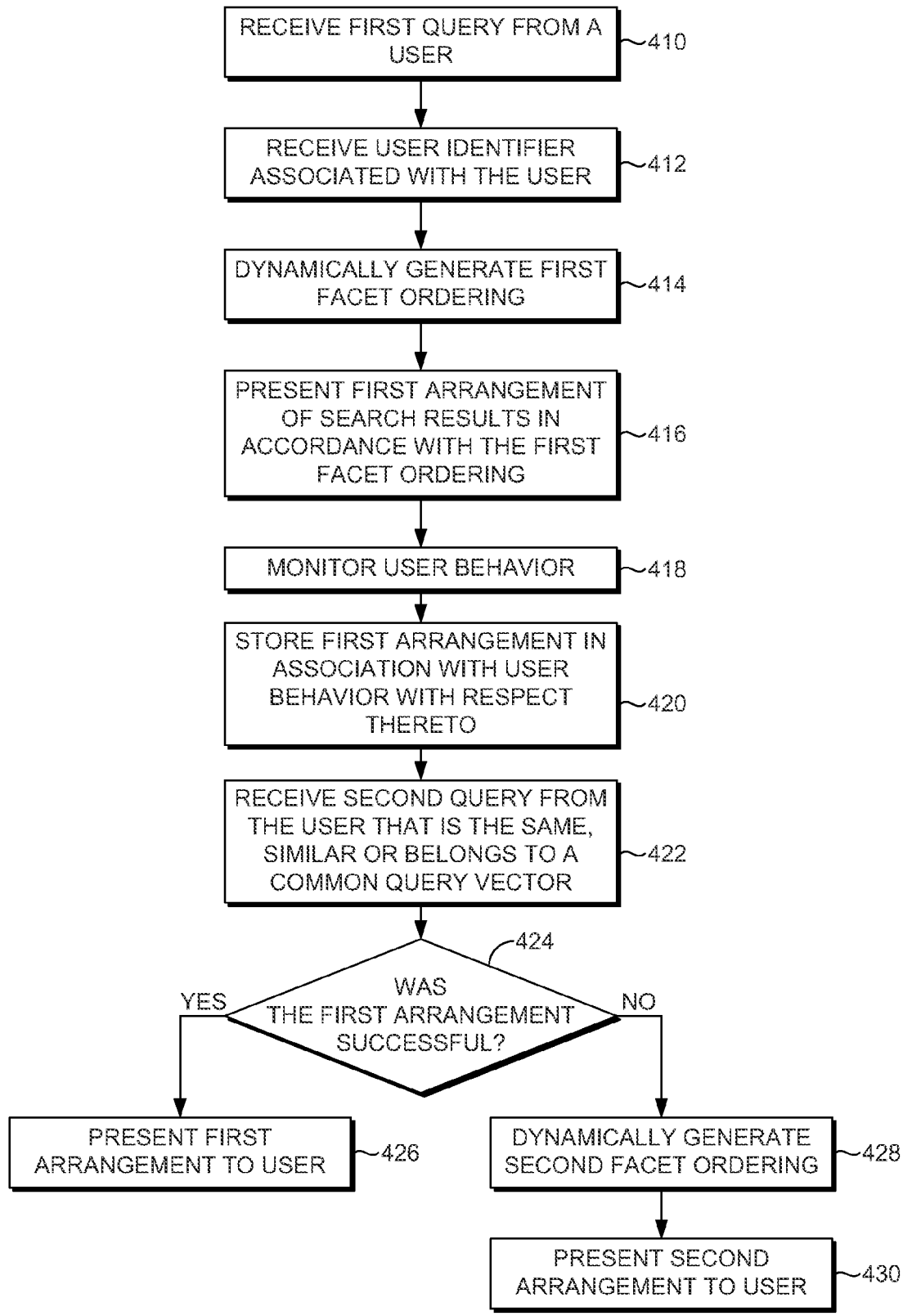
FIG. 4 is a flow diagram showing another method for dynamically ordering facets for search result presentation, in accordance with embodiments of the present invention.

With reference to FIG. 4, a flow diagram is illustrated showing a method 400 for dynamically ordering facets for search result presentation, in accordance with an embodiment of the present invention. As shown at block 410, a first query is received from a user. A user identifier associated with the user is also received, as shown at block 412. A first facet ordering is dynamically generated, as shown at block 414, the first facet ordering including at least a first portion of a plurality of facets that pertain to the first query. A first arrangement of search results in accordance with the first facet ordering is presented, as shown at block 416. At least one measure of user behavior with regard to the first arrangement is monitored, as shown at block 418 and the first arrangement and a value of the at least one measure of user behavior with respect thereto are stored in association with one another, as shown at block 420.

As shown at block 422, a second query is received from the user that is the same, substantially similar to, or that belongs to the same query vector as the first query. Upon receipt of the second query, it is determined whether or not the first arrangement was a successful arrangement based upon the at least one measure of user behavior with regard thereto. This is shown at block 424. If it is determined that the first arrangement was a successful arrangement, arrangement, the first arrangement is presented to the user in response to receiving the second query, as indicated at block 426. If, however, it is determined at block 424 that the first arrangement was a failed or unsuccessful arrangement, a second facet ordering is dynamically generated, as shown at block 428, the second facet ordering including at least a portion of the plurality of facets that pertain to the first query. Search results arranged in accordance with the second facet ordering are then presented to the user, as shown at block 430.

Exemplary Operating Environment

A first exemplary operating environment in which various aspects of the present invention may be implemented is described below in order to provide a general context for various aspects of the present invention. Referring to FIG. 5 in particular, an exemplary operating environment for implementing embodiments of the present invention is shown and designated generally as computing device 500. The computing device 400 is but one example of a suitable computing environment and is not intended to suggest any limitation as to the scope of use or functionality of the invention. Neither should the computing device 500 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

Figure 5:
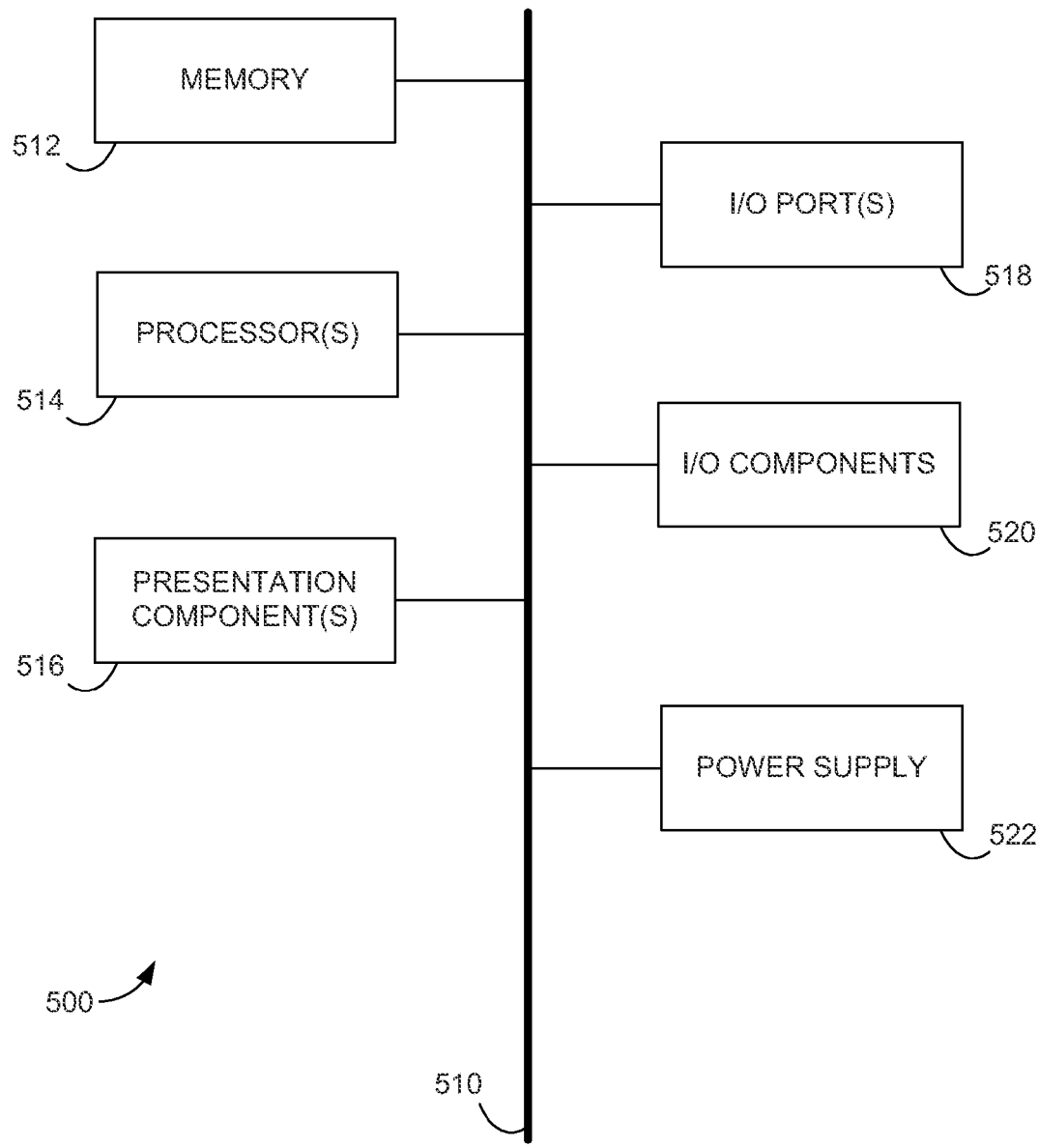
FIG. 5 is a block diagram showing an exemplary computing system environment suitable for implementing embodiments of the present invention.

With continued reference to FIG. 5, the computing device 500 includes a bus 510 that directly or indirectly couples the following devices: memory 512, one or more processors 514, one or more presentation components 516, input/output ports 518, input/output components 520, and an illustrative power supply 522. The bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

The computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 512 includes computer-storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

The I/O ports 518 allow computing device 500 to be logically coupled to other devices including the I/O components 520, some of which may be built in. Illustrative components include a microphone, joystick, game pad, satellite dish, scanner, printer, wireless device, etc.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server is often used herein, it will be recognized that this term may also encompass a client, a set of one or more processes distributed on one or more computers, one or more stand-alone storage devices, a set of one or more other devices, a combination of one or more of the above, and the like.

CONCLUSION

As can be seen, embodiments of the present invention provide systems, methods, and computer-readable media for, among other things systems, methods, and computer-readable media for, among other things, dynamically ordering facets for search result presentation. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 200 of FIG. 2, the method 300 of FIG. 3 and the method 400 of FIG. 4 are not meant to limit the scope of the present invention in any way and, in fact, the steps may occur in a variety of different sequences within embodiments hereof. For instance, though shown in the methods of FIGS. 2 and 4 as occurring just prior to presenting a particular facet-based arrangement, determinations of whether arrangements are successful or not may be made a priori such that this step could be skipped at query run time, Any and all such variations, and any combination thereof, are contemplated to be within the scope of embodiments of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

The invention claimed is:

1. Computer storage devices having computer-executable instructions embodied thereon that, when executed, perform a method for dynamically ordering facets for search result presentation, the method comprising:
   receiving a first query;
   determining a plurality of facets that pertain to the first query;

dynamically generating a first facet ordering, the first facet ordering including at least a first portion of the plurality of facets that pertain to the first query;

providing search results arranged in accordance with the first facet ordering in a first arrangement;

monitoring at least one measure of user behavior with regard to the first arrangement;

storing the first arrangement and a first value of the at least one measure of user behavior with respect thereto in association with one another;

receiving a second query, the second query being the same as the first query;

dynamically generating a second facet ordering, the second facet ordering including at least a second portion of the plurality of facets that pertain to the first query upon identifying that the first arrangement failed as indicated by the first value of the at least one measure of user behavior with respect to the first arrangement;

providing search results arranged in accordance with the second facet ordering in a second arrangement;

monitoring the at least one measure of user behavior with regard to the second arrangement;

storing the second arrangement and a second value of the at least one measure of user behavior with respect thereto in association with one another;

comparing the first value of the at least one measure of user behavior with respect to the first arrangement with the second value of the at least one measure of user behavior with respect to the second arrangement;

determining which of the first and second arrangements yields higher user engagement based upon the comparison of the first and second values of the at least one measure of user behavior with respect to the first and second arrangements; and categorizing one of the first and second arrangements yielding the higher user engagement based upon the comparison as a successful arrangement that is selected for display in response to a third query being the same as the first query and the second query.

2. The computer storage devices of claim 1, wherein the method further comprises:

receiving a user identifier associated with the user;

determining that a particular arrangement in accordance with a particular facet ordering has been shown to the user previously in response to at least one of the first and the second queries;

determining that the particular arrangement is a successful arrangement; and providing the particular arrangement to the user in response to receiving the third query.

3. The computer storage devices of claim 2, wherein the user identifier is one of an anonymous user identifier and a user-segment identifier.

4. The computer storage devices of claim 2, wherein prior to determining that the particular arrangement is a successful arrangement, the method further comprises determining that at least one threshold criterion has been met that permits presentation of the particular arrangement at a present time.

5. The computer storage devices of claim 4, wherein the at least one threshold criterion is one of a user-specific criterion and a time-related criterion.

6. The computer storage devices of claim 1, wherein the method further comprises:

receiving a user identifier associated with the user;

determining that a particular arrangement in accordance with a particular facet ordering has been shown to the user previously in response to at least one of the first and the second queries;

determining that the particular arrangement is a failed arrangement; and providing search results in accordance with an arrangement other than the particular arrangement to the user in response to receiving the third query.

7. The computer storage devices of claim 1, wherein the method further comprises:

receiving a user identifier associated with the user;

determining that a particular arrangement in accordance with a particular facet ordering has been shown to the user previously in response to at least one of the first and the second queries;

determining that at least one threshold criteria has not been met so that presentation of the particular arrangement at a present time is not permitted; and providing an arrangement other than the particular arrangement to the user in response to receiving the third query.

8. The computer storage devices of claim 7, wherein the at least one threshold criterion is one of a user-specific criterion and a time-related criterion.

9. A system for dynamically ordering facets for search result presentation, the system comprising:

a computing device associated with one or more processors and one or more computer storage media;

a data store coupled with the computing device;

a facet ordering component that dynamically generates facet orderings including at least a portion of a plurality of facets, the portion pertaining to a received query; and an arrangement generation component that presents search results in a particular arrangement based upon the facet orderings, wherein the arrangement generation component permits presentation of the particular arrangement at a present time when at least one threshold criterion corresponding to the particular arrangement is satisfied, the at least one threshold criterion is selected from a length of time since a previous presentation of the particular arrangement to the user or a length of time of a prior user interaction with the particular arrangement if the particular arrangement was previously presented to the user; and a monitoring component that:

monitors at least one measure of user behavior with regard to a first arrangement and a second arrangement;

compares a first value of the at least one measure of user behavior with respect to the first arrangement with a second value of the at least one measure of user behavior with respect to the second arrangement;

determines which of the first and second arrangements yields higher user engagement based upon the comparison of the first and second values of the at least one measure of user behavior with respect to the first and second arrangements; and categorizes one of the first and second arrangements as a successful arrangement or a failed arrangement based on the determined higher user engagement, wherein the data store stores one or more of received queries, facets pertaining to received queries, facet orderings, facet arrangements, measures of user behavior: and any values associated therewith, and categories associated with the arrangements, wherein the facet ordering component further dynamically generates one or more subsequent arrangements when previously generated arrangements are categorized as failed arrangements.

10. The system of claim 9, further comprising a facet determining component that determines the plurality of facets that pertain to the received query.

11. The system of claim 9, further comprising a receiving component that receives queries from a user and a user identifier associated with the user.

12. The system of claim 11, wherein; based upon the user identifier associated with the user, the arrangement generation component further:
    determines that a particular arrangement in accordance with a particular facet ordering has been shown to the user previously in response to a received query,
    determines that the particular arrangement is a successful arrangement, and
    presents search results in the particular arrangement to the user.

13. The system of claim 12, wherein; prior to determining that the particular arrangement is a successful arrangement, the arrangement generation component determines that at least one threshold criteria has been met that permits presentation of the particular arrangement at a present time.

14. The system of claim 11, wherein; based upon the user identifier associated with the user, the arrangement generation component further:
    determines that a particular arrangement in accordance with a particular facet ordering has been shown to the user previously in response to a received query,
    determines that the particular arrangement is a failed arrangement, and
    presents search results in accordance with an arrangement other than the particular arrangement to the user.

15. The system of claim 9, further comprising: determining whether the successful arrangement is applicable to a general user population, a particular segment of users, or to a specific user.

16. The system of claim 9, further comprising: filtering subsequent search results for a substantially similar subsequent query based on the aspects included in the successful arrangement for the received query.

17. A computer-implemented method utilizing a processor and one or more computer storage devices for dynamically ordering facets for search result presentation, the method comprising:
    receiving a first query from a user;
    receiving a user identifier associated with the user;
    dynamically generating, using one or more processors, a first facet ordering, the first facet ordering including at least a first portion of a plurality of facets that pertain to the first query;
    providing search results arranged in accordance with the first facet ordering in a first arrangement;
    monitoring at least one measure of user behavior with regard to the first arrangement;
    storing the first arrangement and a first value of the at least one measure of user behavior with respect thereto in association with one another;
    receiving a second query from the user, the second query being the same or similar to the first query; and
    determining whether the first arrangement is a successful arrangement or a failed arrangement based upon the at least one measure of user behavior with regard thereto,
    wherein upon determining that the first arrangement is a failed arrangement based on the first value of the at least one measure of user behavior with respect to the first arrangement, the method further comprises:
    dynamically generating, using the one or more processors, a second facet ordering, the second facet ordering including at least a second portion of the plurality of facets that pertain to the first query; and
    providing search results arranged in accordance with the second facet ordering in a second arrangement.

18. The method of claim 17, wherein the method further comprises:
    monitoring at least one measure of user behavior with regard to the first arrangement and the second arrangement;
    storing the first arrangement and the first value of the at least one measure of user behavior with respect thereto in association with one another; and
    storing the second arrangement and a second value of the at least one measure of user behavior with respect thereto in association with one another.

19. The method of claim 17, wherein the at least one measure of user behavior is selected from the following: dwell time, total session time, search result selection, or quantity of page flips.

20. The method of claim 17, further comprising categorizing the first or second arrangement as a failed arrangement or successful arrangement based on the value of the at least one measure of user behavior.

* * * * *